United States Patent [19]

Allan

[11] 3,807,570
[45] Apr. 30, 1974

[54] SLOT DEPTH FILTER ELEMENT
[75] Inventor: William John Allan, Niagara Falls, Ontario, Canada
[73] Assignee: The Carborundum Company, Niagara Falls, N.Y.
[22] Filed: Sept. 29, 1972
[21] Appl. No.: 293,608

[52] U.S. Cl. ............................ 210/494, 210/497
[51] Int. Cl. ............................................ B01d 27/08
[58] Field of Search ............... 210/444, 497; 55/520

[56] References Cited
UNITED STATES PATENTS
2,883,058   4/1959   Jaume ............................ 210/494
3,173,867   3/1965   Michaels ........................ 210/494
2,742,160   4/1956   Fogwell ......................... 210/494

Primary Examiner—Samih N. Zaharna
Assistant Examiner—F. F. Calvetti
Attorney, Agent, or Firm—David E. Dougherty; William H. Holt

[57] ABSTRACT

A filter element made from a continuous sheet of porous flexible filtration material contained within a fluid impervious cover with open ends for fluid flow. The element is wound in a spiral form to give a cylindrical shape in which the fluid passes through the filter media in a spiral path, thereby allowing an extended contact of the fluid with the filter media. The fluid flow path may be further extended by the use of suitable dividers positioned within the sheet of filter material. The rolled filter element may be fixed permanently in place within a suitable shell, or it may be designed as a replaceable unit.

8 Claims, 5 Drawing Figures

PATENTED APR 30 1974 3,807,570

SLOT DEPTH FILTER ELEMENT

BACKGROUND OF THE INVENTION

Cartridge filters are well known for filtration applications and have been constructed of many different types of materials and internal configurations of filter media. The design of many of these filters has become standardized, using a cylindrical filter housing or shell which contains an inserted element of filter media which may or may not be replaceable, depending on the economics of the particular filtration operation. In this type of filter, the fluid flow usually takes a radial path through the filter media and the filtering path is a relatively short one. This is an advantage when high filter throughput is desired, but it also requires the use of filter media which is sufficiently dense to remove fluid contaminants within the short filtration flow path. In the average cartridge filter, little can be done to increase this filter flow path, other than to increase the density of the filter media. This leads to an undesirable increase in pressure drop across the filter with a possibility of early failure due either to plugging or channeling due to the higher pressure which is set up across the filter media. To overcome this situation, a filter element constructed to allow a longer fluid flow path within the filter media is desirable. While this might be accomplished by building filters of larger diameter, this would be impractical for most cases where the filter has been designed to fit into small spaces or where standard filter housings are already in use which will accept only filter elements or cartridges of a standard size. The element should therefore be one which allows a choice of filter media density and fluid flow path while yet permitting the construction of filter cartridges which could replace those presently in use without dimensional changes.

SUMMARY OF THE INVENTION

The invention pertains to a slot depth filter element for fluids, the element comprising a flexible section of porous filter material, the element being enclosed in a fluid impermeable flexible cover open at both ends of the element. The cover defines a channel for fluids within the element, this being wound in a spiral configuration to form a filter element in which the open ends of the element define an inlet and an outlet for the filtered fluid. The element may contain flexible dividers, extending lengthwise through the element, to reduce fluid channeling within the filter media. The spiral winding of the filter element therefore provides a fluid path of extended depth which permits a substantially increased contact time of filter fluid with the filter media, the increased depth being achieved without increasing the external size of the filter element.

DETAILED DESCRIPTION

Figure 1:
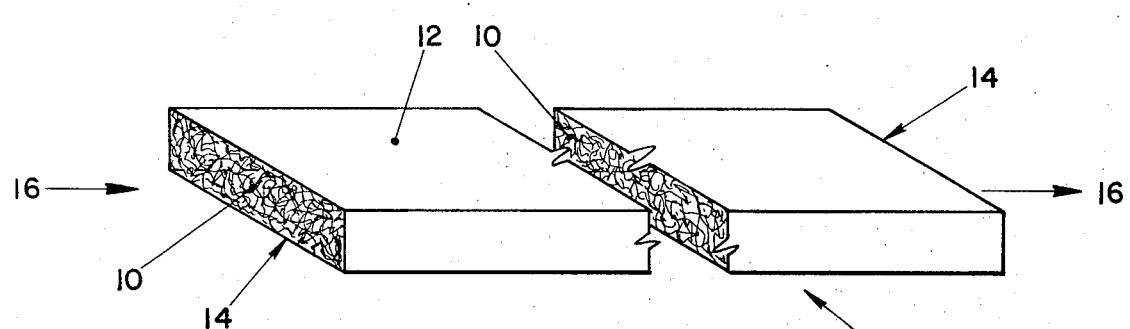
FIG. 1 shows a flexible element of filter media.

The slot depth filter element 11 of the invention is made from a flat rectangular shaped flexible body of porous filter media, the filter media being enclosed in a fluid impermeable flexible cover 12. This construction is shown in FIG. 1 in which the filter media 10 is enclosed by the flexible cover material 12. The ends 14 of the element are open to allow fluid flow through the filter media as shown by the arrows 16. The filter media 10 may be a fibrous material, either woven or nonwoven, the fibers being of cotton, wool, linen or the like, or of polymeric materials such as polyurethanes, polyethylenes, polypropylenes, polyamides, or similar materials. The flexible cover 12 may be a polymeric material such as polyurethane, polyethylene, polypropylene, polyamide, polyvinyl or the like. A cover 12 of a thin flexible metal, such as aluminum or copper may be used if filtration is desired at elevated temperatures. For these applications, filter media of fibrous carbon, graphite, aluminum silicate, aluminum oxide, boron carbide, silica or similar refractory fibers may be used. For applications at the most elevated temperatures, such as molten metal filtration, the filter media may comprise mixtures of ceramic materials, formed in the green state and then fired to give a rigid filter element of the desired configuration. In this application the ceramic material of the filter media would be selected to yield a porous structure after firing, while a ceramic glaze might be used to seal the outer surfaces of the ceramic filter element to prevent leakage.

Figure 2:
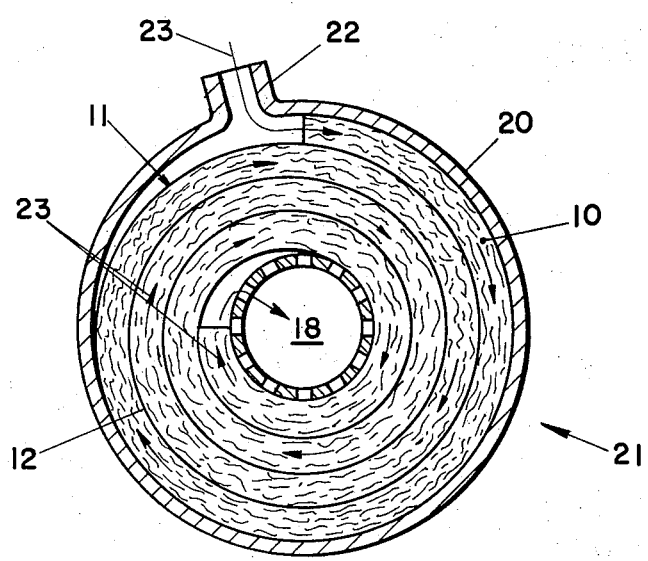
FIG. 2 shows the configuration of the element of FIG. 1 as formed into a cylindrical shape within a shell to form a filter cartridge.
Figure 3:
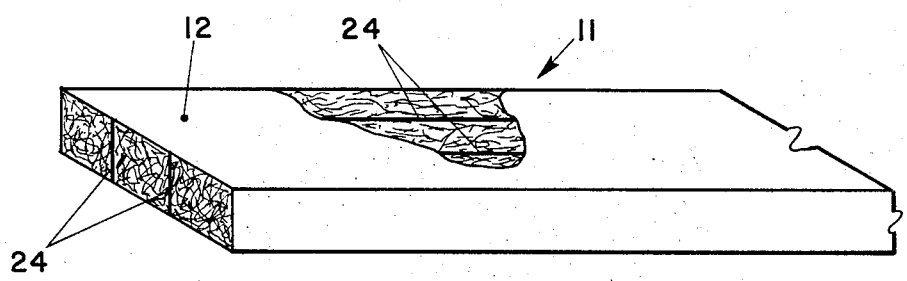
FIG. 3 shows the element of FIG. 1, having dividers to reduce channeling.
Figure 4:
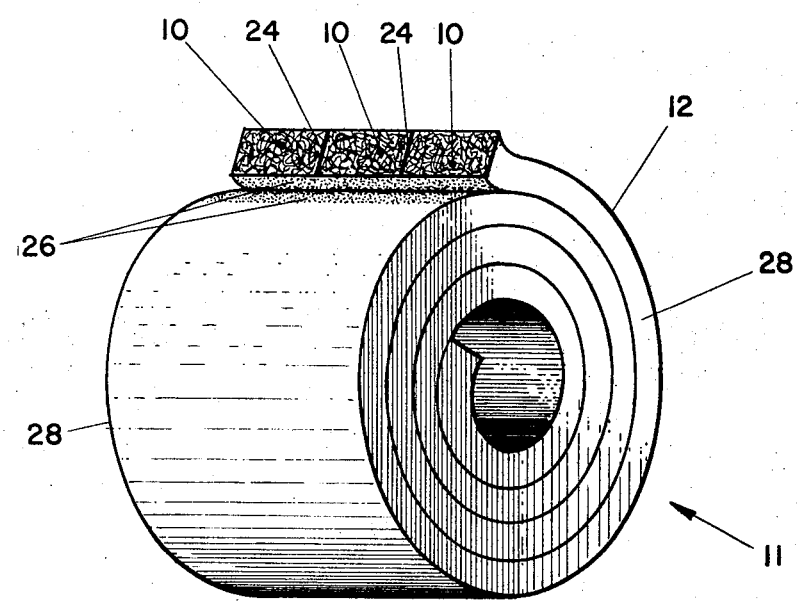
FIG. 4 shows the element of FIG. 3, formed into a cylindrical shape.

The filter media 10 should be firmly packed within the flexible cover 12 to inhibit channeling of the fluid along the interior of the cover walls. The compression of the filter media can be varied along the length of the element 11 so that the fluid stream encounters successively denser media as it flows through the element. As an alternate construction, the element 11 may contain fibrous material of relatively large diameter fibers which would first remove coarse particles from the fluid, followed by fibers of smaller diameter to successively remove smaller particles. The filter media 10 is not restricted to fibrous materials, but may also comprise flexible foamed polymeric material such as polyurethanes, polyethylenes, polypropylenes, polyamides and the like, the foamed material having interconnecting pores to permit fluid passage therethrough. After fabrication, the filter element 11 is formed in a spiral roll around a filter core 18, the rolled element forming a cylindrical shape which is thus inserted in a suitable metallic or plastic shell 20 to form a filter cartridge 21. A top view of the cartridge is shown in FIG. 2 where the shell as shown at 20 and the fluid inlet at 22. The arrows 23 show the spiral path of the fluid through the filter media, with the filtrate passing out through the core 18. The direction of flow is not critical and may take place in the reverse direction if desired. Another view of the rolled filter element 11 is shown in FIG. 4. This not only shows the configuration of the rolled element, but also shows the use of dividers 24 which may be disposed lengthwise throughout the fluid channel within the interior of the element. The dividers 24 are flexible fluid impermeable strips, one or more of which run lengthwise through the interior of the element 11, thereby dividing it into a plurality of parallel slots or fluid paths, as shown in FIG. 3, this construction reduces the possibility of fluid channeling through the filter media. The dividers may be of the same materials as those of the cover 12 and, while flexible, are yet sufficiently rigid to help support the cover 12 against a possible collapse when it is wound into a spiral roll as in FIG. 4.

During the final assembly of the roll, a layer of adhesive sealant 26 is applied across the surface of the roll (see FIG. 4) to hold the end of the element 11 in place and to prevent fluid leakage between the turns of the roll. Additional layers of adhesive sealant are also applied over the surfaces 28 at each end of the roll to seal against suitable end caps (not shown). The end caps, in combination with a suitable shell 20, such as shown in FIG. 2 with inlet and outlet connections for fluid flow, provide a long spiral filtering path for the fluid. The filter element 11 may be fixed permanently in place, within the filter shell, or it may be designed as a replaceable unit.

Figure 5:
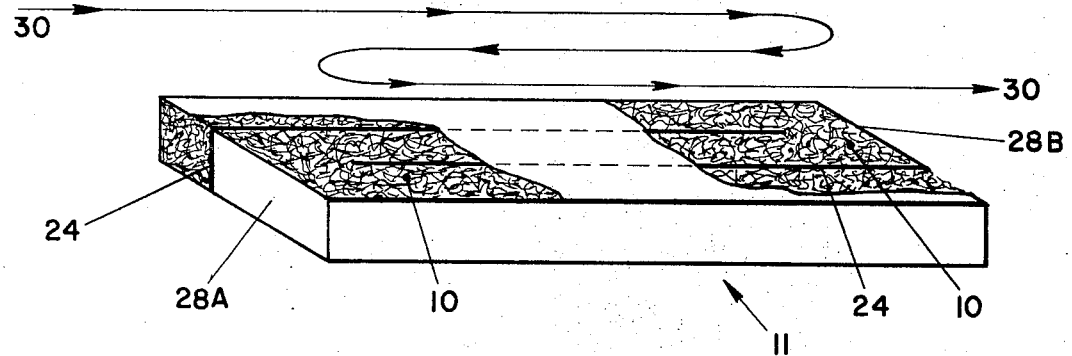
FIG. 5 shows a modification of the element of FIG. 3 in which the dividers are arranged to direct the fluid in a reverse flow through the element.

An extended filtering path of increased depth may be obtained by modifying the dividers as shown in FIG. 5. Here the filter element 11 is shown with two dividers 24. Two of the ends of the element are closed at each end at 28a and 28b. The divider opposite each closed end is shortened to permit fluid flow along one side of the divider and a reverse flow along the other side. This flow is shown by arrows 30, resulting in a threefold increase of the fluid flow path. While two dividers are shown for illustration, more can be used if an even longer flow path is desired. The filter element is rolled in a spiral and assembled in cartridge form as previously described. Although the longer flow path may result in a decreased fluid throughput, the extended contact with the filter media may be advantageous where extremely fine particles must be removed from the fluid or where the particles are removed by the adsorptive powers of the filter media, thus requiring more contact time for effective removal.

I claim:

1. A filter element for fluids, comprising a flat rectangular shaped flexible body of porous filter material, an impermeable flexible cover enclosing said body only along its longitudinal length, said element having a permeable first end and a permeable second end distant from said first end, said cover defining a longitudinal channel for the flow of fluid through the enclosed filter material, said element being formed in a spiral roll configuration to form a cylindrical shape in which said first end and said second end define an inlet and an outlet for the fluid.

2. A filter element according to claim 1 in which the element contains at least one flexible impermeable divider disposed lengthwise throughout the fluid channel within the interior of the element.

3. A filter element according to claim 1 in which the porous filter media is a fibrous material contained within the fluid channel.

4. A filter element according to claim 1 in which the porous filter media is a foamed plastic material contained within the fluid channel.

5. A filter element according to claim 2 in which the impermeable flexible cover and flexible divider therein comprise polymeric materials selected from the group consisting of polyethylene, polypropylene, polyvinyl chloride, polyurethane and polyamide.

6. A method for making a filter element for fluids, comprising:
   a. forming a flat rectangular shaped flexible body of porous filter material;
   b. enclosing the body along the longitudinal length thereof in an impermeable flexible cover, open at both ends of the body for forming the filter element;
   c. wrapping said element in a spiral roll configuration for forming a cylindrical shape; and
   d. sealing the interface between the layers of said spiral roll for precluding axial and longitudinal fluid flow between said layers, whereby said fluid flow is restricted to spiral flow through said filter material and within said flexible cover.

7. A method according to claim 6 wherein said step of sealing includes adhesively securing an end cap on each end surface of said cylindrical shape for precluding axial flow through said spiral roll.

8. A method according to claim 6 wherein said step of sealing further includes applying an adhesive sealant across the surface of said roll and applying an adhesive sealant to both end surfaces of said cylindrical shape for engaging end caps thereon.

* * * * *